United States Patent [19]
Nickstadt

[11] 3,851,537
[45] Dec. 3, 1974

[54] GEAR DRIVE REVERSING MECHANISM
[75] Inventor: Gerhard A. Nickstadt, Oakland, N.J.
[73] Assignee: General Electric Company, Fort Wayne, Ind.
[22] Filed: Feb. 19, 1974
[21] Appl. No.: 443,439

Related U.S. Application Data
[62] Division of Ser. No. 284,946, Aug. 30, 1972, Pat. No. 3,812,736.

[52] U.S. Cl. .................................. 74/404, 74/458
[51] Int. Cl. ...................... F16h 57/10, F16h 55/04
[58] Field of Search ............ 74/416, 404, 423, 458, 74/425

[56] References Cited
UNITED STATES PATENTS

| | | |
|---|---|---|
| 1,195,831 | 8/1916 | Marcellot ...................... 74/457 UX |
| 1,947,853 | 2/1934 | King .................................. 74/458 |
| 2,190,856 | 2/1940 | Young ................................ 74/473 |
| 2,453,656 | 11/1948 | Bullard .............................. 74/422 |
| 2,992,566 | 7/1961 | Walker .......................... 74/404 UX |
| 3,178,955 | 4/1965 | Enders et al. ...................... 74/369 |

*Primary Examiner*—Leonard H. Gerin

[57] ABSTRACT

A gear drive reversing mechanism is disclosed for driving two output shafts in mutually opposite rotary directions by means of a drive shaft rotating in a constant direction. The mechanisms include spiral angle face gears driven by pinions having both right-hand and left-hand spiral angle pinion gear teeth.

4 Claims, 7 Drawing Figures

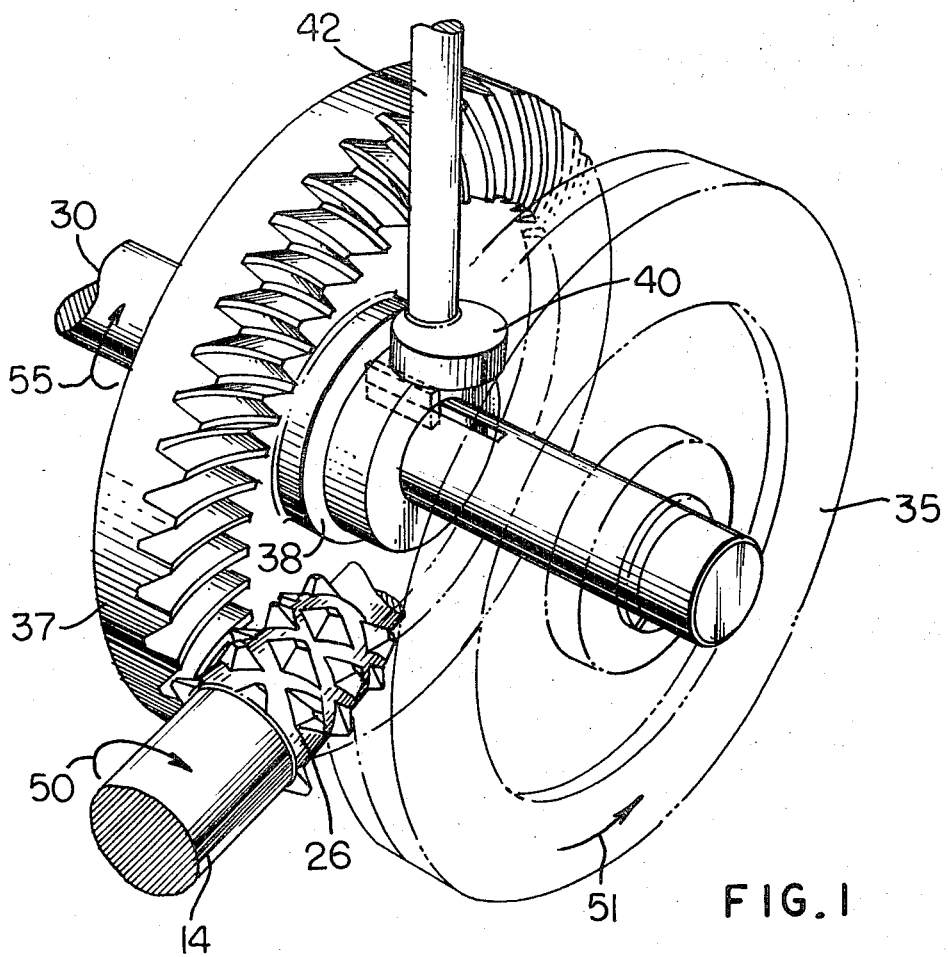
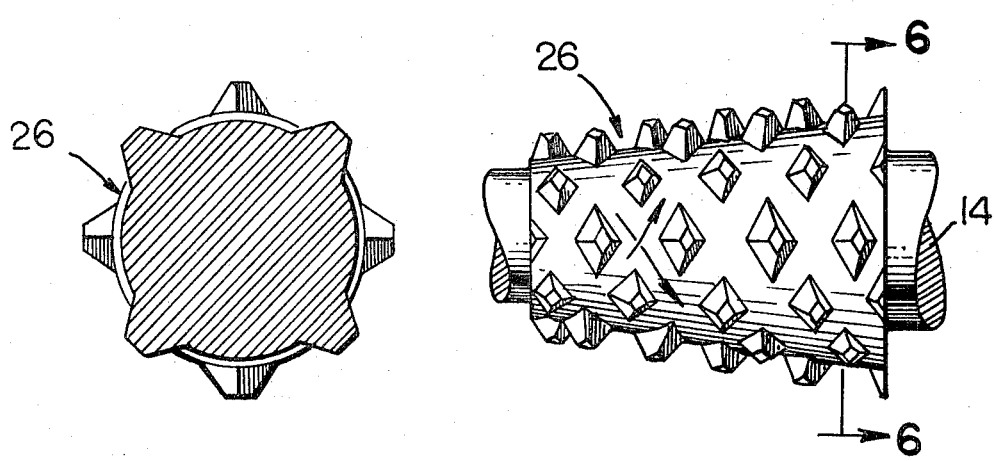

3,851,537

GEAR DRIVE REVERSING MECHANISM

CROSS REFERENCE TO RELATED APPLICATION

This application is a division of my now allowed and co-pending patent application Ser. No. 284,946, which was filed Aug. 30, 1972, now U.S. Pat. No. 3,812,736. The entire disclosure of my said co-pending patent application is incorporated herein by reference.

BACKGROUND OF THE INVENTION

This invention relates generally to drive reversing mechanisms, and particularly to drive reversing mechanisms of the types which employ one or more sets of gears. Thus, it is a general object of the invention to provide an improved drive reversing mechanism.

More specifically, it is an object of the invention to provide a mechanism for driving two output shafts in mutually opposite rotary directions by means of a rotatable drive shaft rotating in a constant direction.

Another object of the invention is to provide a mechanism for providing reversed direction of rotation of output shaft means driven by a rotatable drive shaft without need for shifting radially the output shaft means.

Another object of the invention is to provide a gear drive reversing mechanism which does not require inclusion of an idler gear.

Another object of the invention is to provide a drive reversing mechanism which is inexpensive to construct consisting of a relatively few number of easily assembled parts.

A more specific object of the invention is to provide a drive reversing mechanism for simultaneously driving two co-axial output shafts in opposite directions by the application of torque transmitted by the mechanism from a drive shaft rotating unidirectionally.

SUMMARY OF THE INVENTION

In carrying out the above and other objects, I provide a gear drive reversing mechanism that results in reversed direction of rotation output shaft means that is driven by a drive shaft rotating in a constant direction. The mechanism comprises a drive pinion secured to the drive shaft and having both right-hand and left-hand spiral angle gear teeth. A first face gear having spiral angle gear teeth is mounted to an output shaft facing the drive pinion. A second face gear having spiral angle gear teeth is also mounted to an output shaft facing the first face gear with the drive pinion rotatably positioned between the first and second face gears.

In one illustrated embodiment of the invention, a gear drive reversing mechanism is provided comprising a first shaft mounted for rotation about a first shaft axis and a first face gear having right-hand spiral angle face gear teeth mounted to the first shaft. A second shaft is mounted for rotation about a second shaft axis and a second face gear having left-hand spiral angle face gear teeth is mounted to the second shaft. The mechanism further includes a rotatably mounted pinion having right-hand spiral angle pinion gear teeth in mesh with the right-hand spiral face gear teeth, and having left-hand spiral angle pinion gear teeth in mesh with the left-hand spiral angle face gear teeth. Rotation of the pinion in a constant direction simultaneously drives the first and second shafts in mutually opposite rotary directions.

BRIEF DESCRIPTION OF THE DRAWING

FIG. 1 is a perspective view of a drive reversing mechanism, and this view illustrates the application of some principles of the present invention.

FIG. 5 is a side view in elevation of the drive pinion employed in the drive reversing mechanism shown in FIG. 1.

FIG. 6 is a cross-sectional view of the drive pinion shown in FIG. 5 taken along plane 6—6.

DESCRIPTION OF THE PREFERRED EMBODIMENTS

Figure 2:
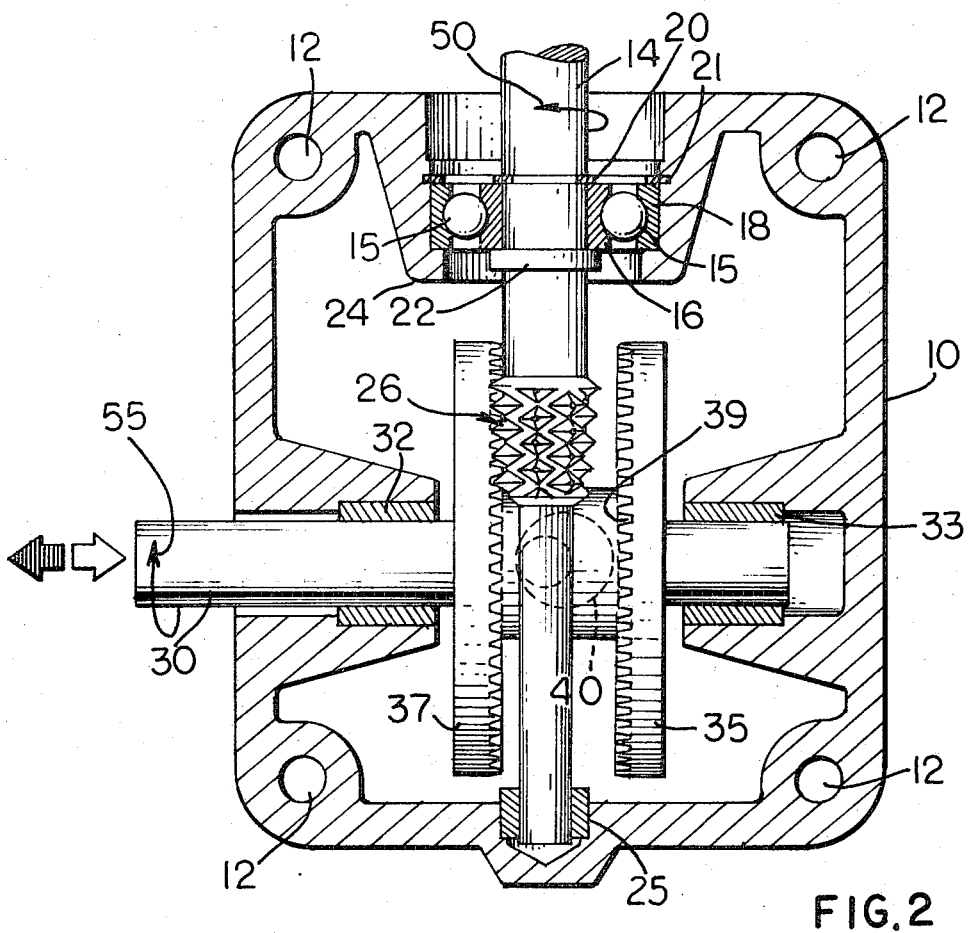
FIG. 2 is a bottom plan view of the drive reversing mechanism shown in FIG. 1 mounted in a housing. The housing and bearings mounted therein are shown in cross section.

Referring now in more detail to the drawing and in particular to FIGS. 1 and 2, there is shown a drive reversing mechanism that illustrates the application of some principles of the present invention and including a housing 10 which may be made of aluminum, steel, cast iron or the like. Four threaded holes 12 in the housing provide means by which a housing plate may be secured with a gasket held therebetween. A drive shaft 14 is journalled through a ball bearing in the housing. The bearing comprises a set of annularly disposed balls 15 rotatably disposed between an inner race 16 and an outer race 18. The two races are maintained in position by snap ring 20 secured to drive shaft 14, by snap ring 21 disposed within an annular recess in the housing, by shaft shoulder 22, and by housing shoulder 24. The terminal end of the drive shaft is journalled in bushing 25 mounted in a housing wall opposite that in which the ball bearing is disposed.

Drive shaft 14 includes a truncated, conic drive pinion 26, the details of which may be seen most clearly by reference to FIGS. 5 and 6. The pinion includes both right-hand spiral angle gear teeth and left-hand spiral angle gear teeth, which are longitudinally coextensive along the pinion. Shaft 14 and pinion 26 are preferably made of carbonized and hardened steel with the pinion teeth being formed by grinding. The shaft and pinion are preferably of unitary construction.

An output shaft 30 is journalled through support bearings, in the form of bronze bushings 32, 33, that are mounted within opposing walls of housing 10. Output shaft 30 passes above drive shaft 14 within the housing cavity with the axes of the two shafts oriented substantially normal to each other. Two face gears 35 and 37 are rigidly secured to output shaft 30 with pinion 26 disposed therebetween. The two face gears are spaced apart a distance sufficiently great to insure that only one of the face gears engages the drive pinion at any given time. As will hereinafter be explained in more detail, the output shaft and face gears are adapted to be moved axially to bring face gears 35 and 37 alternatively into mesh with drive pinion 26.

The teeth of face gear 37 are right-hand spiral angles while those of face gear 35 are left-hand spiral angles. They, as well as the output shaft to which they are secured, are formed of hardened steel. Such face gears may be purchased from the Illinois Tool Works Inc. of Chicago, Illinois which, in combination with tapered pinions, are sold under the trademark "Spiroid".

Figure 3:
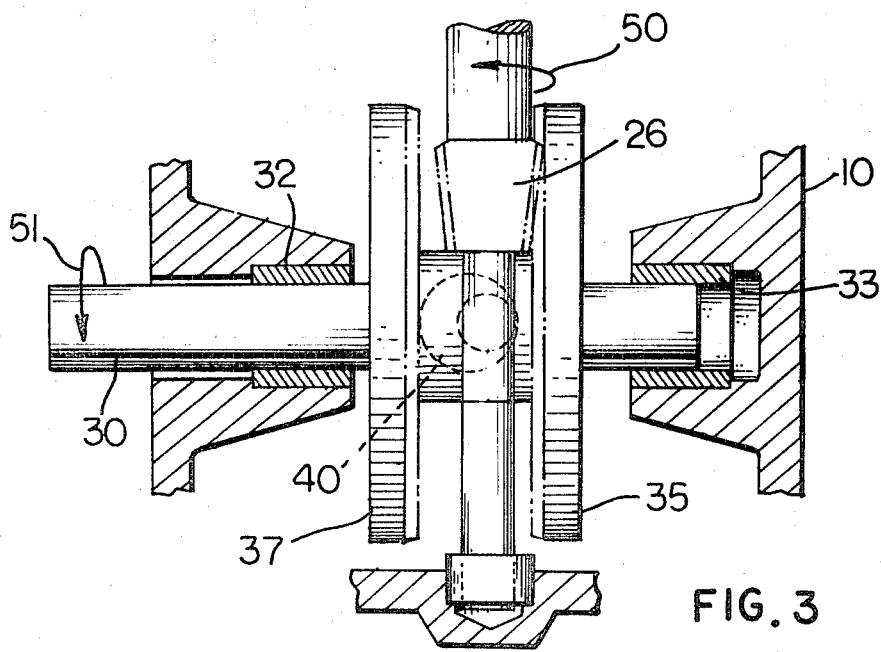
FIG. 3 is a bottom plan view of the drive reversing mechanism shown in FIG. 1 including portions of the housing illustrated in FIG. 2. Relative positions of selected mechanism components are shifted in FIG. 3 from positions assumed in FIG. 2 to effect reversing.
Figure 4:
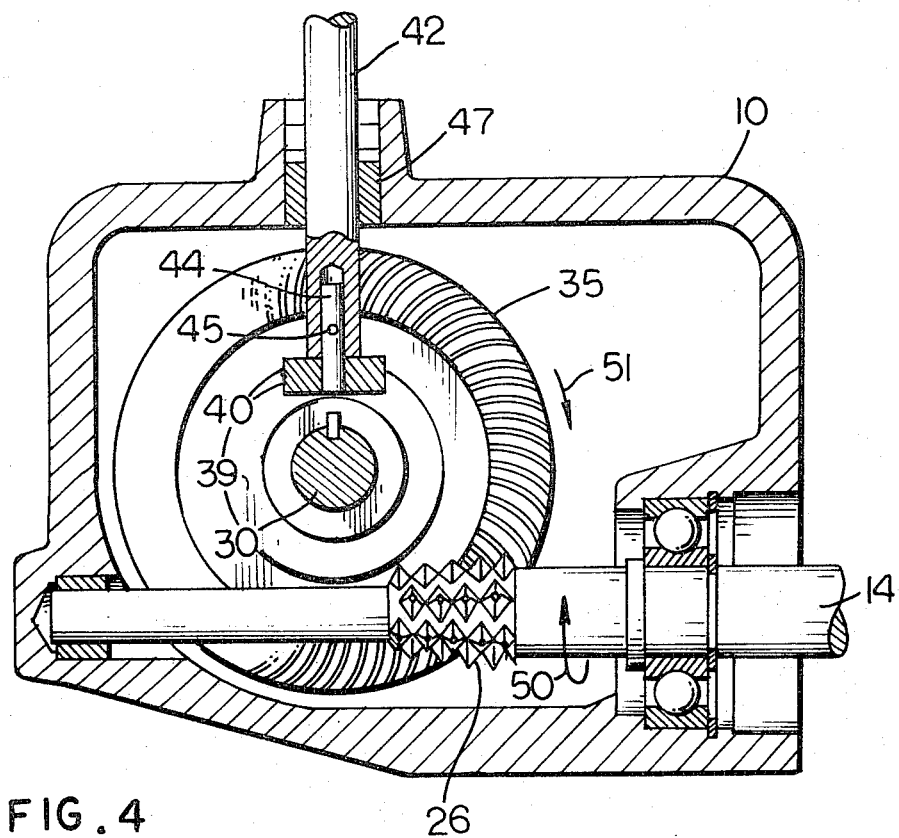
FIG. 4 is a side view in elevation of the drive reversing mechanism shown in FIG. 3 with a portion of the mechanism housing shown in cross section and with one face gear removed for clarity.

It is preferred to provide means for moving face gears 35 and 37 alternatively into and out of mesh with drive pinion 26. With reference next to FIGS. 1, 3, and 4, this means has been illustrated as comprising an annular cam 40 mounted to the end of control rod 42. Cam 40 is mounted to the control rod in sliding contact with hubs 38 and 39 of face gears 37 and 35, respectively, and with the cam axis offset from that of the control rod. Where mechanical play is desired, the cam is mounted in contact with only one face gear at one time.

Cam mounting is accomplished by means of pin 44 which is press fitted into aligned channels within the cam and control rod. A crosspiece 45 is press fitted in pin 44 and control rod 42 to inhibit axial movement of the pin. Rod 42 is journalled through bushing 47 mounted within housing 10 to the housing exterior.

As a final assembly step, a housing cover is secured and the housing interior then partially filled with a lubricating oil. Lubrication is facilitated by the presence of both left-hand and right-hand spiral angle pinion gear teeth which are longitudinally coextensive.

In operation, drive shaft 14 may be rotated unidirectionally such as clockwise as indicated by arrow 50 with drive pinion in mesh with right-hand spiral angle face gear 37 as seen in FIGS. 1 and 2. The resultant torque transmitted to the face gear causes it and output shaft 30 to rotate clockwise as indicated by arrows 55. Should reverse rotation become desired, rotation of the drive pinion and output shaft is momentarily halted and rod 42 rotated a half turn. This action causes cam 40 to force the face gears and output shaft to move axially. As the face gears move, gear 37 disengages drive pinion 26. As the half turn of the rod and cam is completed, left-hand spiral angle face gear 35 engages the drive pinion. Mesh will ordinarily occur with higher gearing ratios whereas with lower ratios conventional spring bias may be applied to the face gears to insure mesh upon recommencement of pinion rotation. With pinion 26 now in engagement with face gear 35, clockwise rotation is again imparted to the drive pinion. Output shaft 30 then is driven counterclockwise as indicated by arrow 51 in FIGS. 1 and 4 when the mechanism components are in the relative positions thereof depicted in FIGS. 3 and 4. To return the rotation of the output shaft back to its original direction rod 42 is merely rotated another half turn causing face gear 35 to disengage the drive pinion and face gear 37 shortly thereafter to reengage the pinion while rotation of the drive pinion and face gears is momentarily arrested.

For some applications avoidance of axial movement of the output shaft may be desired. Under such circumstances face gears 35 and 37 may be rigidly secured to a tubular sleeve about shaft 30 thereby permitting relative axial movement between the face gears and output shaft upon rotation of cam 40. In such cases rotational slippage of the face gears upon the shaft is prohibited or limited by keys and keyways, or by meshed, coaxial teeth formed on the exterior of the shaft and interior of the tubular sleeve.

Figure 7:
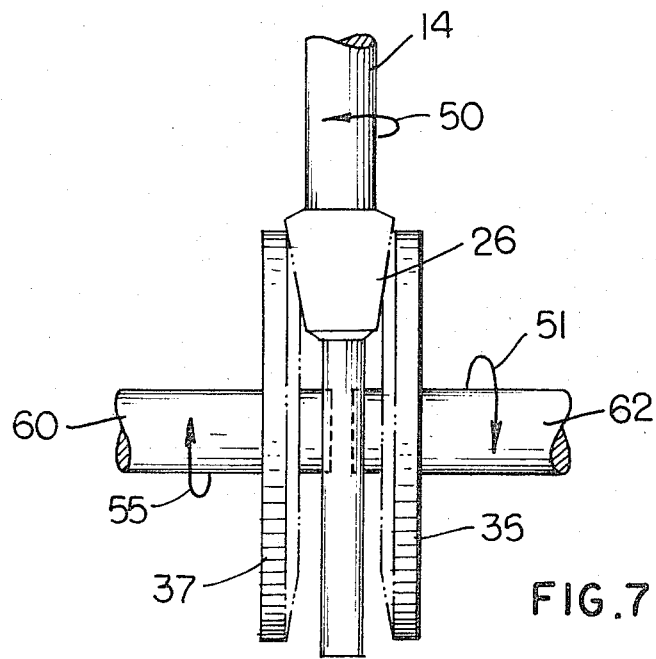
FIG. 7 is a diagrammatical view of a modified form of the drive reversing mechanism shown in FIG. 1, and embodying the present invention in one form.

FIG. 7 illustrates another embodiment of the invention which may be constructed through a modification of the drive reversing mechanism just described. Here, rather than reversing the direction of a single output shaft, two independent, coaxial, output shafts 60 and 62 are simultaneously driven in opposite directions as indicated by arrows 51 and 55, respectively. Each is simultaneously in mesh with drive pinion 26. Again, face gear 37 is right-hand spiral angle while face gear 35 is left-hand spiral angle.

It should be understood that the just described preferred embodiment merely illustrates principles of the invention. Many other modifications may be made thereto without departure from the spirit and scope thereof as set forth in the following claims.

What I claim as new and desire to secure by Letters Patent of the United States is:

1. A gear drive reversing mechanism comprising a first shaft mounted for rotation about a first shaft axis; a first face gear mounted to said first shaft and having right-hand spiral angle face gear teeth; a second shaft mounted for rotation about a second shaft axis; a second face gear mounted to said second shaft and having left-hand spiral angle face gear teeth; and a rotatably mounted pinion having right-hand spiral angle pinion gear teeth in mesh with said right-hand spiral angle face gear teeth and having left-hand spiral angle pinion gear teeth in mesh with said left-hand spiral angle face gear teeth; whereby rotation of said pinion in a constant rotary direction drives said first and second shafts in mutually opposite rotary directions.

2. A gear drive reversing mechanism in accordance with claim 1 wherein said first and second shaft axes are substantially coextensive.

3. A gear drive reversing mechanism in accordance with claim 2 wherein said right-hand and left-hand spiral angle pinion gear teeth are longitudinally coextensive along said pinion.

4. A gear drive reversing mechanism in accordance with claim 2 wherein said first and second shaft axes transverse the axis of rotation of said pinion at substantially a right angle therewith.

* * * * *